United States Patent [19]
Seaver

[11] Patent Number: 6,034,811
[45] Date of Patent: Mar. 7, 2000

[54] STRESS-OPTIC BEAM SCANNER, SYSTEM AND METHOD

[76] Inventor: George Seaver, 19 Mystery La., Cataumet, Mass. 02534

[21] Appl. No.: 09/014,496

[22] Filed: Jan. 28, 1998

[51] Int. Cl.[7] .................................................. G02F 1/33
[52] U.S. Cl. ............................... 359/305; 359/321
[58] Field of Search ........................ 359/285, 305, 359/307, 310, 311, 321; 235/470

[56] References Cited

U.S. PATENT DOCUMENTS

| 4,000,493 | 12/1976 | Spaulding et al. | 359/305 |
|---|---|---|---|
| 4,757,195 | 7/1988 | Katagiri et al. | 359/305 |
| 5,016,957 | 5/1991 | Seaver | 350/96.13 |
| 5,095,515 | 3/1992 | Seaver | 385/16 |
| 5,383,048 | 1/1995 | Seaver | 359/279 |
| 5,504,615 | 4/1996 | Singh et al. | 359/305 |

*Primary Examiner*—Georgia Epps
*Assistant Examiner*—Margaret Burke
*Attorney, Agent, or Firm*—Richard P. Crowley

[57] ABSTRACT

A stress-optic beam scanner and system which includes a stress-optic material selected to permit the scanning of an optical beam on a target typically over a scanning angle of greater than five degrees. The system includes a piezoelectric element controlled by a microprocessor to control the mechanical stress applied to the stress-optic material.

41 Claims, 6 Drawing Sheets

STRESS-OPTIC BEAM SCANNER, SYSTEM AND METHOD

BACKGROUND OF THE INVENTION

Optical beam switches and systems employing the optical beam switches are described in U.S. Pat. No. 5,016,957, issued May 21, 1991, and U.S. Pat. No. 5,095,515, issued Mar. 10, 1992, both hereby incorporated by reference.

The optical switch described alters the path of an optical beam from an outlet window of an optically transparent photoelastic material between a stressed beam position and an unstressed beam position by about 0.050. The optical switch includes an optically transparent photoelastic material whose index of refraction changes with mechanical stress and means to include piezoelectric plates secured to the photoelastic material to impart a mechanical force parallel to the surface of the photoelastic material and perpendicular to the optical beam to alter the optical beam path between two predetermined positions of close proximity by a change in throughput angle.

It is desirable to provide a new optical beam scanner to scan continuously an optical beam, and application systems, and methods using the optical scanner to provide for single or multiple dimension scanning at high speeds over wide scanning angles.

SUMMARY OF THE INVENTION

The invention comprises a stress-optic (S-O) optical beam scanner, system employing the scanner and methods of scanning.

A stress-optic beam scanner system which comprises an optical beam source to provide an optical beam to be scanned; an optically transparent S-O material having an inlet window to receive the optical beam and an outlet window to transmit a scanned optical beam; the S-O material having properties to permit the scanning of the optical beam over scanning angles of greater than about five (5) degrees; means to apply a mechanical force of a selected amount and direction to the S-O material sufficient to provide a change in the gradient of the index of refraction of the S-O material; and a target means to receive the transmitted scanned beam.

In one embodiment, the invention comprises an optical beam scanner for the continuous or discontinuous scanning of an optical beam, such as, but not limited to, a pulsed laser beam, in a solid state, high speed manner. The optical scanner includes an optically transparent S-O material of selected properties having an inlet window and an outlet window and which S-O material changes in index of refraction when subjected to mechanical stress to provide an output optical beam which scans at angles greater than about five (5) degrees. The optical scanner includes means to induce mechanical stress such as piezoelectric material secured to the S-O material to apply and to change continuously a selected force to create stress and selected changes in the index of refraction gradient and provide either a single or two-dimensional optical beam scanner. The means to induce mechanical stress is such as to allow the optical beam to be scanned at speeds of greater than 1 kHz. The optical scanner permits an optical beam to be scanned over large angles, rather than to be switched between two nearby selected internal positions. The use of piezoelectric material allows high speed scanning due to the Mhz response capability of the piezoelectric effect.

Prior art optical switches employed traditional optical glass; however, to provide scanning at angles of greater than about five (5) degrees, the S-O material is selected to have a high index of refraction, e.g., about 2.4 or greater, or a lower Young's modulus, e.g., less than about $3.2 \times 10^{+6}$ psi or higher stress-optical coefficients, e.g., greater than about $0.2 \times 10^{-6}$ per psi, or combination of such properties. The S-O coefficient is based on the expression:

$$K_\| = n^3/E[\mu p_{12} - p_{11}/2] \text{ or}$$
$$K_\perp = n^3/2E[\mu p_{11} + (\mu-1)p_{12}] \quad \text{Equation (1)}$$

where $K_\|$ is the S-O coefficient parallel to the applied stress; $K_\perp$ is the S-O coefficient perpendicular to the applied stress; $\mu$ is Poisson's ratio; n is the index of refraction; $p_{12}$ and $p_{11}$ are Pockel's coefficients for force and direction; and E is Young's modulus.

Acceptable S-O material would include, but not be limited to, arsenic compounds such as arsenic trisulfide ($As_2S_3$), and arsenic selenide (AsSe). For S-O materials like $As_2S_3$, the index of refraction is 1.4 larger, Young's modulus 3.2 times smaller, and Pockel's coefficient is 1.3 times larger than for those materials used in the prior art, leading to a ten fold increase in the S-O coefficient in Equation (1). Since the beam deflection is directly proportional to the stress gradient, the optical path length and the S-O coefficient, a ten fold increase in the beam deflection is provided by the use of these new S-O materials.

The S-O material in the optical scanner may have a positive index of refraction change with stress such that under an imposed bending gradient, the optical path length changes from physical length and index changes reinforce each other, suitable examples of such S-O materials being tellurium dioxide (for a parallel polarization), titanium dioxide (parallel polarization) and gallium arsenide (for polarization parallel to and perpendicular to the applied stress). Where a compressive stress gradient is used, the S-O material is chosen to have a negative index of refraction change with stress such that under these conditions the optical path length changes from length and index also reinforce each other, suitable examples of such S-O material includes dense flint glass (SF 57), lead molybdate, arsenic trisulfide, and germanium selenide arsenide.

The optical beam employed in the optical scanner and system may vary and would include in particular, pulsed or continuous wave lasers or other optical beams depending upon the target to be scanned such as laser beams of about 630 nm to about 2000 nm with CW beams typically used for bar and matrix code scanning and pulsed laser beams used for light detection and ranging (LIDAR) purposes. Collimated "white" or incandescent optical beams can be employed for optical sensor application.

The target of the scanning beams provided by the optical scanner and system may include one or multiple dimensional bar or other coding on articles such as pricing cards. The scanner may be used to read commercial two-dimensional matrix codes known as Code-1, PDF-417, MAXICODE, and IDMATRIX CODE, at conveyor belt speeds, requiring scan rates of 1 kHz or greater which are not obtainable with the present mechanical bar code scanners. The scanner may also be used on very small matrix codes such as on computer chips and pharmaceutical products. The beam diameter would be larger for such small matrix codes, e.g. 2–6 mm, and requires a focusing lens after the outlet window to focus the beam to a spot diameter of 0.1 mm or smaller about 2 to 6 inches in front of the scanner. Larger diameter beams can be achieved through the use of thicker S-O material or the use of an entrance lens to reduce the diameter of the beam as the beam goes through the S-O material and a focusing lens at the outlet window, as well as the use of multiple, parallel S-O materials and beams. Targets also include one or more satellites or missiles, space debris, or space stations and the optical scanner may be positioned on such targets or on earth or another planet.

The system permits application where larger scan angles, e.g. larger than 30 degrees, are required. In such applications, two separate scanning beams may be used that scan different sectors with a small area of overlay. Scanning may be done at speeds of greater than 1 kHz, which is greater than that obtainable with the prior art of mechanical scanning techniques.

In another embodiment of the invention, the applied force on the S-O material may vary from a force parallel to the surface and generally perpendicular to the optical beam, as in the prior art, or perpendicular to the surface and generally perpendicular to the optical beam, such as by applying piezoelectric materials to different surfaces of the S-O material, so as to create a compressive force and a compressive stress gradient. Optical glasses, such as fused silica glasses, can withstand about 7100 psi in tension, 9700 psi in bending, and 1,660,000 psi in compression. Although compressive shear stresses can not reach this high compressive limit, the use of compressive shear force can achieve a four fold increase over the bending stress limit, and therefore, create greater beam deflection for the same material and size modulator. Thus, the application of compressive stress perpendicular to the surface and the optical path exploits the much greater strength of optical materials in compression than in tension.

In a further embodiment of the invention, the optical scanner may scan in two or more dimensions at high speeds, such as by employing two one-dimensional optical scanners in series, and at an angle to each other such as about ninety (90) degrees, so that the optical beam can be scanned in two dimensions (X,Y). Force may be applied to multiple sides of a S-O material such as to four sides of a S-O material, to permit two-dimensional scanning in a single optical scanner. Two-dimensional scanners may also include S-O material wherein a bending moment gradient is applied in one direction and a compressive stress gradient is applied in a direction generally perpendicular to the bending moment gradient in a single S-O material. The force may be applied and monitored by the use of piezoelectric material secured to the S-O material and controlled by a microprocessor to produce the desired forces and directions.

In a further embodiment, the optical beam path within a S-O material may be increased in length either by physically increasing the length of the S-O material of the scanner, or preferably, by beam reflective means to reflect the optical beam in the S-O material back and forth several or multiple times as required, thereby increasing the optical beam deflection for a given S-O material size. Reflection of the optical beam to increase path length is accomplished by causing an internal portion of the ends of the input and output windows of the S-O material to be mirrored to reflect the optical beam.

The optical scanner of the invention may be employed in various systems in combination with a microprocessor for the control of the amount of mechanical force and stress gradient and their direction imposed within the S-O material by piezoelectric material, such as plates secured to the S-O material. The systems usually would include a target for the scanning beam which target may be a single or two-dimensional bar code, or commercial code, or satellite, or other optical beam target.

Such systems may include various additional components as required such as: X and Y voltage signal A/D converters; an X and Y voltage signal amplifier; optical reflected return beam detection; a beam splitter to return a portion of the reflected return beam to the detector and microprocessor for feedback and base line control purposes. The system may be incorporated in fixed or portable (hand held) housings, use optical fibers for transmission of the optical beam, and include light sensors, X-Y scanners, lens, X-Y detectors, and combinations thereof in the system.

In a particular embodiment, the single or two-dimensional scanner system of the invention comprises: a scanner to scan continuous and then optionally to fix on command the optical beam at a set target or location. The system would include an optically transparent S-O material whose index of refraction is subject to change with mechanical stress and optionally permits scanning at angles of greater than five (5) degrees and having an inlet window and an outlet window. The system includes an optical beam source to direct an optical beam, like a pulsed laser beam, to the input window. The system includes a means to provide the mechanical force and its direction to the S-O material, such as piezoelectric plates secured at selected locations on the S-O material and subject to continuous command of an electrical signal to change the index of refraction gradient and provide for single or two-dimensional (X and Y) beams scanning from the outlet window onto a proposed target. The system includes, preferably, feedback means from the optical beam reflected back from the target and back through the S-O material and to the microprocessor means which controls electrical signals to the piezoelectric plates and the mechanical stress of the S-O material. The system may also include as described, X and Y analog to digital (A/D) convertors and associated amplifiers that are controlled by the microprocessor and provide voltage signals to the piezoelectric plates. The system provides for the continuous modulation of the index of refraction in single or two dimensions within an optical material through controlled modulation of the refractive index gradient to scan continuous with an optical beam a proposed target at high speeds over angles greater than about five (5) degrees.

The various embodiments may be adapted and used in various combinations within the system. The invention comprises scanners and systems with novel functions, S-O materials and a manner of imposing and detection of mechanical stress, optical path configuration, two-dimensional beam movement, and scanning and the control of single and two-dimensional optical beams by microprocessors.

The invention will be described for the purposes of illustration only in connection with certain illustrated embodiments, however, it is recognized that various changes, modifications, additions and improvements may be made to the illustrated embodiments by those skilled in the art all falling within the spirit and scope of the invention.

DESCRIPTION OF THE EMBODIMENTS

Figure 7:
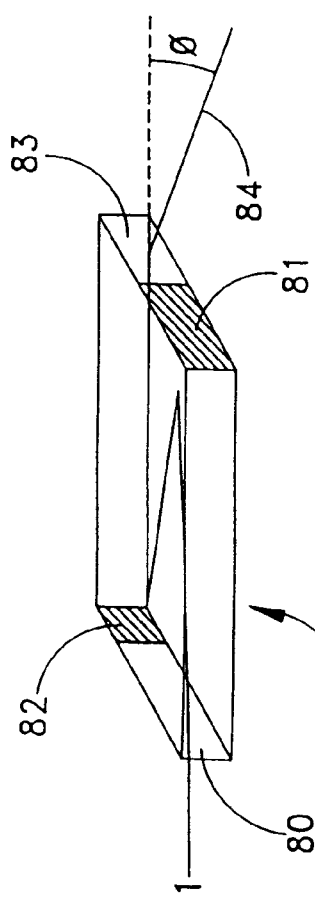
FIG. 7 is a schematic of a means of amplifying the deflection of an optical scanner by partially mirroring the input and output windows thereby providing for multiple passes of the optical beam.
Figure 8:
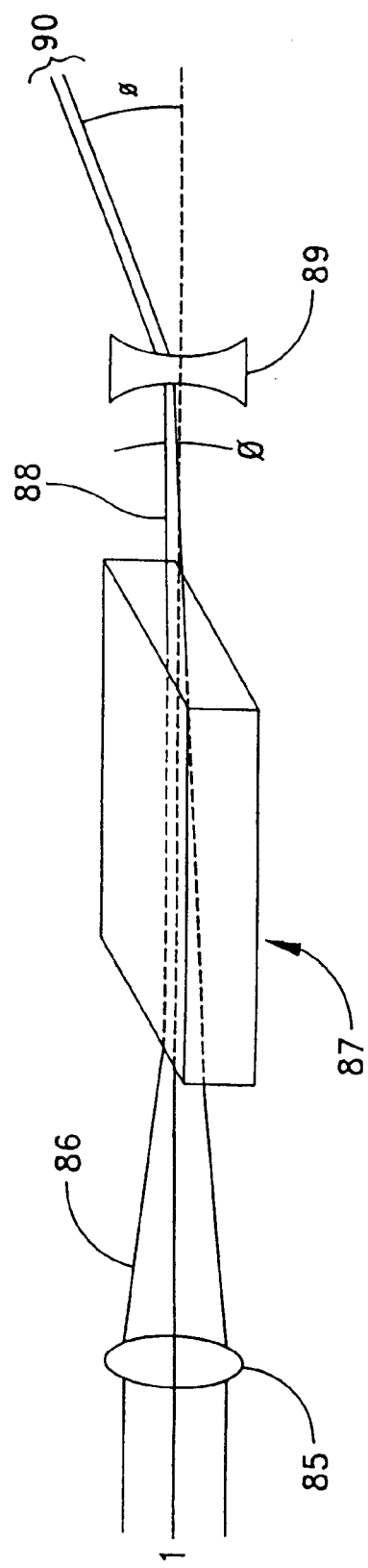
FIG. 8 is a schematic of a means to amplify the deflection of an optical scanner by appropriate input and output lenses.
Figure 9:
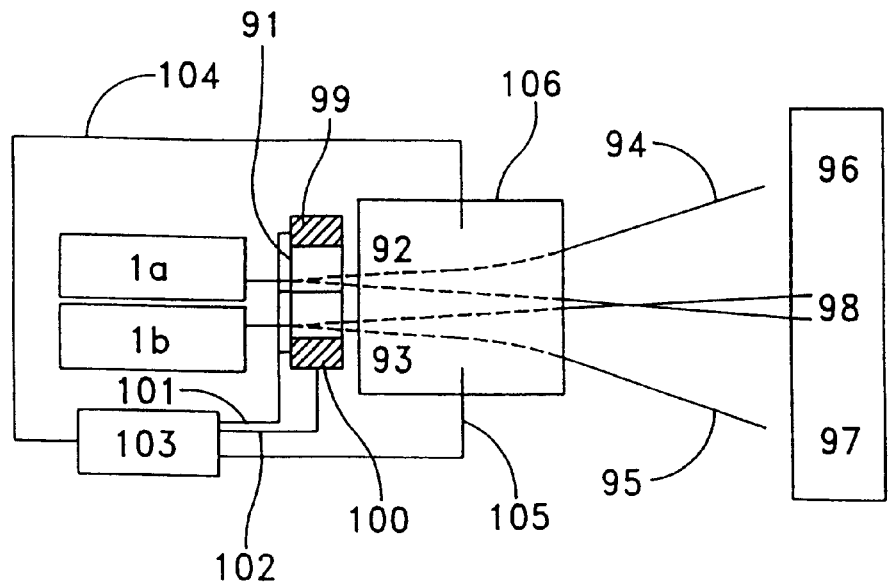
FIG. 9 is a schematic of an optical scanner system for very large scan angles whereby two separate scanning beams scan two separate sectors that overlap.

There are 14 figures included here as embodiments. FIGS. 1 to 6 show the four unique innovations of this invention; these are stress-optic (S-O) scanning and deflection to large scan angles, the use of compressive forces and stress gradients, two-dimensional scanning and deflection and the use of a microprocessor as an integral part of S-O scanning and deflection. FIGS. 7 to 9 show beam scan angle magnification, and FIGS. 10 to 14 show systems and applications of the basic innovations.

Figure 1:
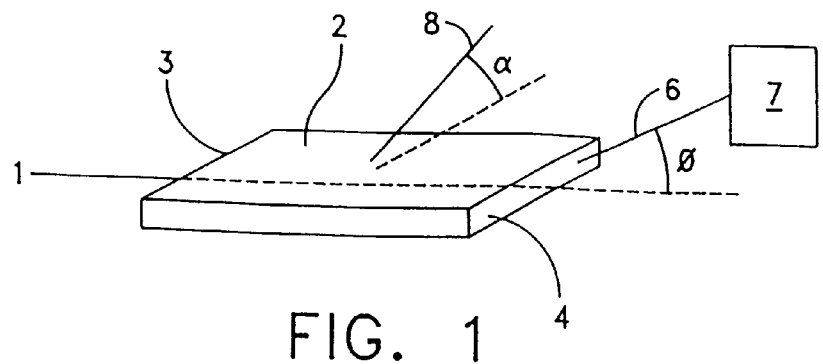
FIG. 1 is a schematic, illustrative view of the basic optical scanner of the invention.

FIG. 1 shows the basic Stress-Optic (S-O) large-angle, continuous scanner and on-command deflector of this invention. An optical beam 1 enters optical material 2 of high S-O coefficient through entrance window 3, and exits as beam 6 through exit window 4 at angle θ to its entrance direction and into receiver 7. Force means 8 is applied perpendicular to the beam and at angle α to the S-O material 2, thus creating a stress and index of refraction gradient within modulator 2 and causing the beam 6 to be deflected or scanned at angle φ and towards receiver 7. Receiver 7 can be a bar code, a 2-D matrix code, a satellite receiver, a airborne target, a missile, an optical fiber core, etc.

Figure 2:
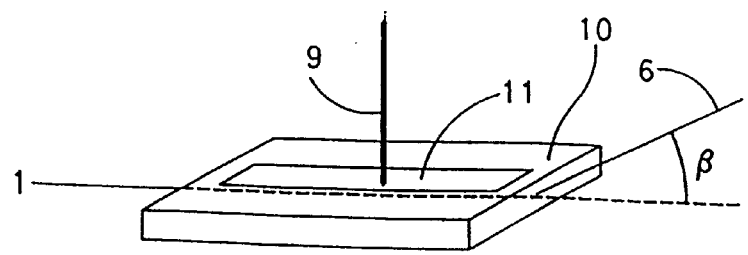
FIG. 2 is a schematic view of the optical scanner utilizing a compressive force and stress.

FIG. 2 shows a means of applying a compressive force 9 and of creating a resultant compressive stress and index gradient within a S-O material 10. Compressive force 9 is applied to anvil 11 along the axis of 10 and just to the side of the beam 1 traversing within modulator 10. Beam 1 thus traverses within the horizontal stress and index gradient created by anvil 11 and exits as beam 6 at horizontal angle β to its entrance direction.

Figure 3:
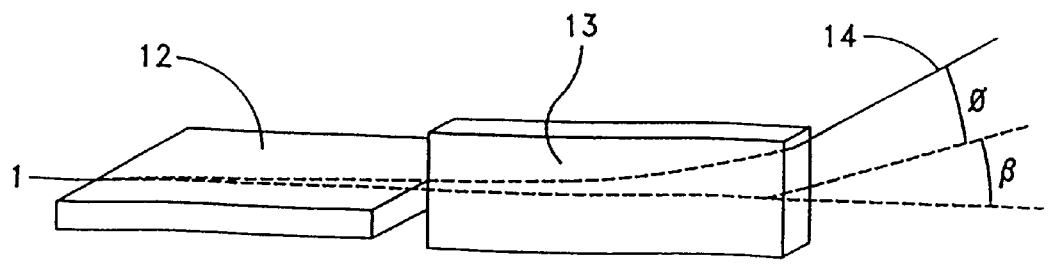
FIG. 3 is a schematic of a two-dimensional optical scanner utilizing two scanners in series.
Figure 4:
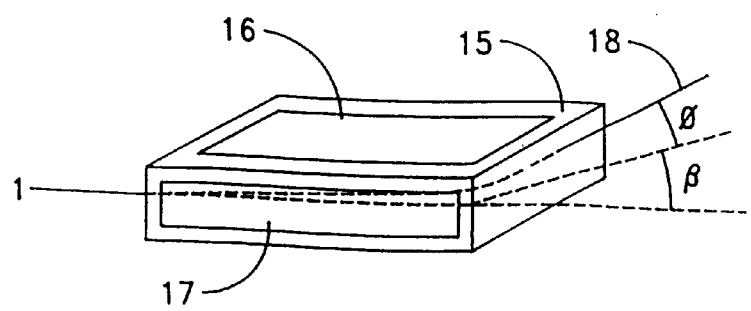
FIG. 4 is a schematic of a two-dimensional optical scanner whereby stresses are applied independently to each of the four sides of optical material with piezoelectric films.
Figure 5:
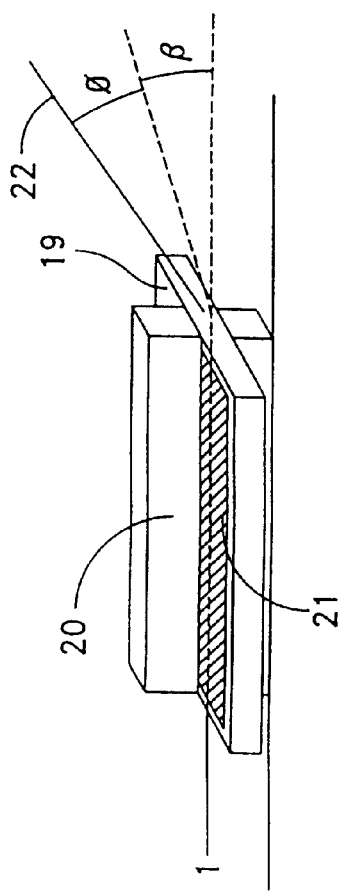
FIG. 5 is a schematic of a two-dimensional optical scanner whereby stresses are applied independently and co-linearly to each other with piezoelectric films for the bending gradient and piezoelectric actuators for the compression gradient.

FIGS. 3, 4 and 5 show three means of creating two-dimensional (2-D) beam scanning and deflection for the beam transmitting S-O modulators.

In FIG. 3 a 1-D scanner 12 is placed in series and perpendicular to a second 1-D scanner 13, so that beam 1 transiting both scanners exits as beam 14 at horizontal angle β and vertical angle φ to its entrance direction.

In FIG. 4 the 2-D deflection is accomplished within the single modulator 15. Optical beam 1 enters modulator 15 and is deflected vertically by the stress field created by piezoelectric films 16 and is deflected horizontally by the stress field of piezoelectric film 17, causing beam 18 to exit modulator 15 at vertical angle φ and horizontal angle β. Piezo films 16 and 17 can be adhered to one side or to the two opposing sides of modulator 15 and are independently commanded by an applied voltage to expand or contract and thus to impose a stress gradient and resultant index of refraction gradient within modulator 15, thus independently creating a vertical or horizontal deflection or scanning of the beam 18.

FIG. 5 shows 2-D deflection and scanning within a single modulator, but with one-dimensional deflection caused by an external compressive force and its internal stress gradient. Beam 1 enters modulator 19 and is deflected horizontally by the horizontal compressive stress and index gradient created by compression force 20 and deflected vertically by the vertical stress and index gradient created by the bending moment imposed by piezoelectric film 21. Beam 1 then exits as beam 22 at horizontal angle β and vertical angle φ to the entrance direction of beam 1.

Figure 6:
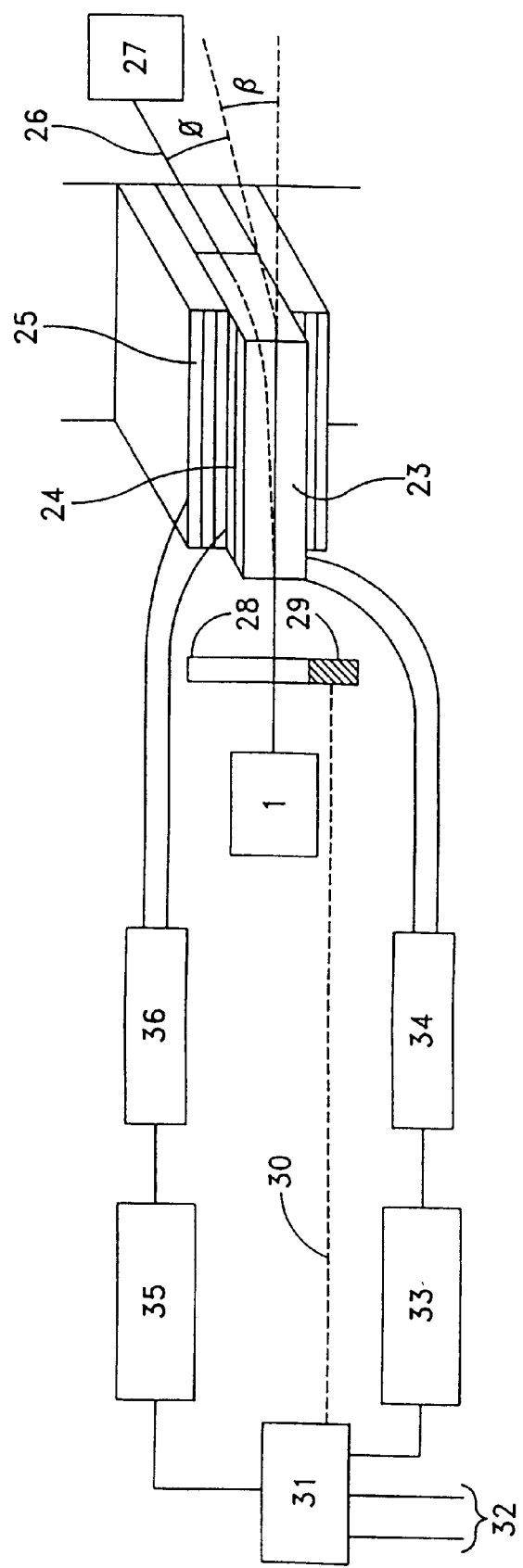
FIG. 6 is a schematic of a two-dimensional optical scanner system whereby a microprocessor and a return signal detector provide on-command beam pointing and feedback.

FIG. 6 shows the use of a microprocessor as an integral part of the S-O deflection and scanning invention, specifically to provide the on-command tracking and pointing of an optical beam with feedback from a return signal. As before, optical beam 1 enters S-O modulator 23 and is deflected vertically by a stress and index gradient created by actuator 24 and deflected horizontally by a stress and index gradient created by actuator 25, finally exiting from modulator 23 as beam 26 at horizontal angle β and vertically angle φ towards receiver target 27. A reflected optical signal from the receiver/target 27 is returned co-linearly along beam 26 and is separated out by beamsplitter 28 and detected by sensor 29, thus providing a feedback signal 30 to microprocessor 31. Micro-processor 31 can be directed by external inputs 32 or by its own internal memory and program, to provide digital signals to digital-to-analog (D/A) converters 33 and 35 which provide analog voltage signals to the vertical axis amplifier 34 and the horizontal amplifier 36. These amplifiers in turn drive the vertical deflector 24 and the horizontal deflector 25.

In FIGS. 7 to 9 we show three methods to increase the scan and deflection angle of the S-O scanner of this invention while keeping its physical size constant; the first method is through the use of multiple internal reflections of the sensing beam within the modulator, the second method is through the use of input and output optics and the third method is through the use of multiple scan beams and the partitioning of the scanned area into multiple, overlapping sections.

FIG. 7 shows beam 1 entering the S-O modulator 79 through entrance window 80, then being reflected off of mirror faces 81 and 82 and exiting as beam 84 through window 83 at angle φ to the beam 1 direction, angle φ being approximately three times larger than it would have been with but one path through the modulator.

FIG. 8 shows beam 1 being focused by lens 85 through modulator 87 towards a focal point beyond negative lens 89. Beam 86 is deflected by S-O modulator 87, exits as beam 88 at angle φ to the beam 1 direction, and is further deflected by lens 89, exiting that lens as beam 90 at an angle of φ to the beam 1 direction. Angle φ is proportional to and greater than angle φ.

FIG. 9 shows beams 1a and 1b passing through beam-splitter 91 and entering S-O modulator sections 92 and 93, respectively, at slightly different angles to each other. The upper beam exits modulator 92 as beam 94 and is deflected or scanned across receiver section 96, and the lower beam exits modulator 93 as beam 95 and is deflected or scanned across receiver section 97; these two sections overlap in area 98. Receivers 96 and 97 send back separate return signals that are split off by beam-splitter 91 to detectors 99 and 100, respectively. Detectors 99 and 100 respond by sending this information as electrical signals 101 and 102 to microprocessor 103 which decodes this information and "stitches" it back together. In addition to decoding, storing and displaying the return signal, the microprocessor accepts external commands and programming to direct the horizontal and vertical deflectors 106 through electrical voltage signals 104 and 105. These commands can, for example, cause the beams to move to a new position, to begin a single new sector scan or to begin a continuous scan pattern.

FIGS. 10 through 14 show unique systems and methods that incorporate the S-O scanning and deflection invention.

Figure 10:
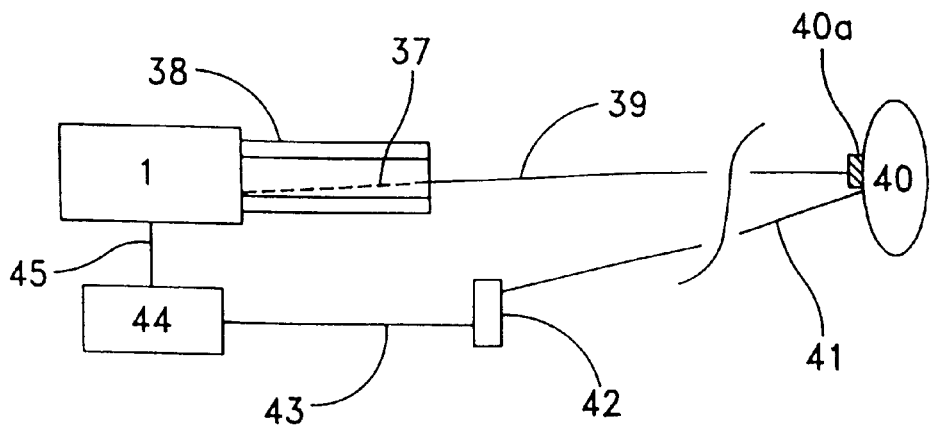
FIG. 10 is a schematic of a two-dimensional optical scanner and microprocessor for use in laser communications with and between such distant objects as satellites.

FIG. 10 shows a particular application of this invention for laser communications with distant stations, such as for ground communications with satellites in orbit around the earth or communications between satellites in orbit. Laser beam 1 enters modulator 37 and is deflected through the action of the horizontal and vertical (x-y) actuator 38 and then exits as beam 39 towards satellite receiver 40a. Satellite 40 emits a continuous reference beam 41 which is received at the laser station by detector 42. Feedback signal 43 allows the microprocessor 44 to determine where satellite 40 is located in the scan field of laser 1 and then to command x-y actuator 38 to deflect beam 39 to maximize the received signal intensity at detector 40a and, thus, to continue to track and point towards satellite 40.

Figure 11:
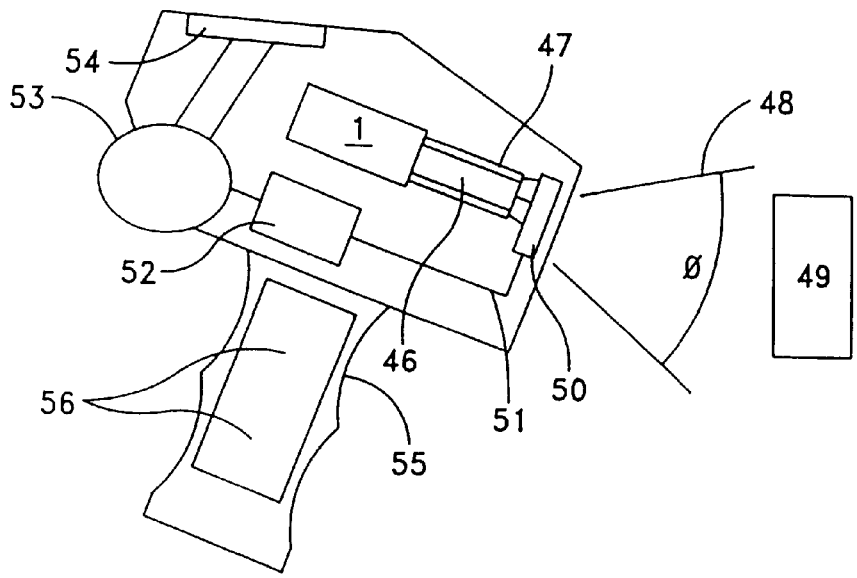
FIG. 11 is a schematic of an optical scanner system for portable, hand-held operation in such applications as the reading of bar and matrix codes.

FIG. 11 shows an application of the S-O scanning and pointing invention for the reading of bar and 2-D matrix codes with a hand-held device. Laser beam 1 enters modulator 46 and is deflected by actuator 47 and exits as laser beam 48, scanning through angle φ across bar or 2-D code 49. The beam reflected by code 49 is detected by beam splitter/detector 50 which then sends this information as electrical signal 51 to microprocessor 52, which then decodes it, stores it in memory 53 and displays it in window 54. Handle 55 contains batteries 56 for powering the hand-held, portable electronics.

Figure 12:
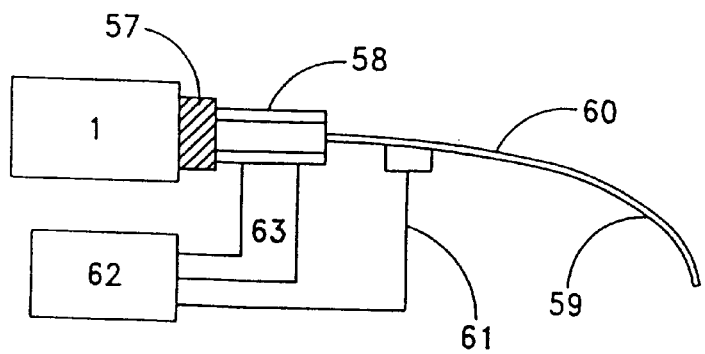
FIG. 12 is a schematic of a two-dimensional optical deflection system for continual and permanent realignment of a laser to its single mode fiber coupling.

FIG. 12 shows the application of the S-O deflection invention to the re-coupling of a laser diode to the core of a single mode fiber as the alignment ages or is disturbed due to shock. Laser beam 1 is focused by lens 57 through the 2-D deflector 58 into the core of single mode fiber 59. Sensor 60, either permanent or temporary, detects through the fiber cladding the throughput optical power and conveys this as electrical signal 61 to microprocessor 62. Microprocessor 62 compares this value with a stored value and adjusts voltages 63 to the deflectors 58 so as to maximize the throughput optical power at sensor 60.

Figure 13:
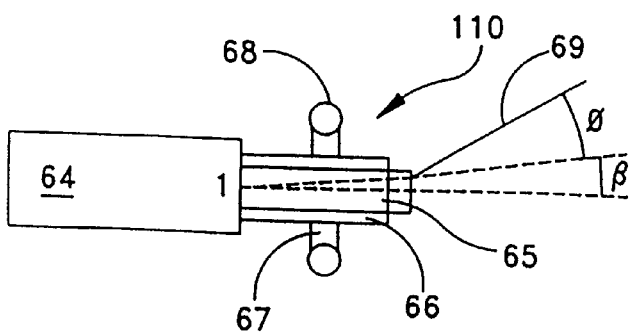
FIG. 13 is a schematic of an integrated two-dimensional optical scanner and laser head as one unit.

FIG. 13 shows the integration of the S-O deflection invention into the structure of a laser or laser diode package. Integral to laser 64 is S-O deflector 110 with or without a lens between them. Laser beam 1 transits modulator 65 and is scanned or deflected under the influence of horizontal actuator 66 and vertical actuator 67, exiting as beam 69 at vertical angle φ and horizontal angle β. Compression retaining ring 68 allows actuator 67 to impose a compressive force to and compressive gradient within modulator 65. The laser/scanner package is a single, rugged unit.

Figure 14:
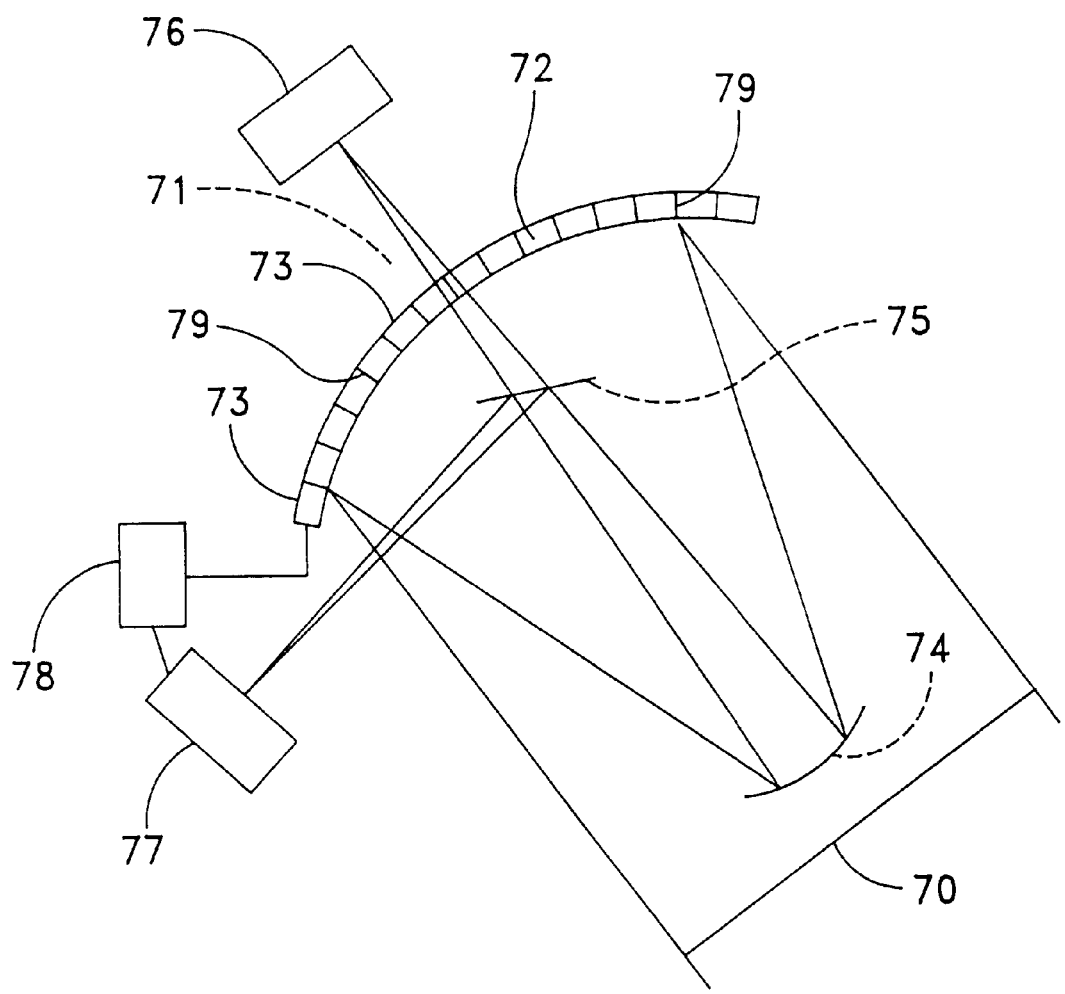
FIG. 14 is a schematic of two-dimensional micro-deflectors used in the primary mirror of astronomical telescopes to correct for atmospheric distortions to the incoming radiation by providing a many segmented tilt correction based upon a many segmented wavefront sensor.

FIG. 14 shows the application of the S-O deflector invention as multi-segmented beam-tilt correctors in the primary mirror of such devices as astronomical telescopes and LADARS, to provide adaptive optic correction to the incoming or outgoing wavefront. This system corrects for such wavefront and full-beam disturbances as atmospheric turbulence and equipment vibrations, and is particularly useful in the case of laser communications and their problems of signal scintillation and fade and platform vibrations. Incoming radiation 70 is reflected and corrected by the primary mirror 71 and its S-O micro-deflectors of this invention 72, the micro-deflectors with their former exit windows 73 now mirrored. The radiation 70 from the primary focusing mirror is folded back by the secondary mirror 74 to the tertiary mirror and beam splitter 75 which passes the majority of the energy to the CCD imager 76, but with a sample portion reflected to the wavefront sensor 77. The wavefront sensor 77 sends its information as an electrical signal to microprocessor 78 which determines the departure of the wavefront 70 from planarity and sends this information as tilt corrections to the individual microdeflector piezoelectric films 79. The multi-segments 72 of the primary mirror 71 tilt the beam segments through the action of these piezoelectric films 79 to correct the wavefront back to a planar state. For the reverse case of outgoing laser communications the CCD imager 76 becomes the transmitting laser 76 which is entirely transmitted by beamsplitter 75, and the incoming radiation 70 becomes the reference beam from a satellite or the target return beam, which is now entirely reflected by the beamsplitter 75 to the wavefront sensor 77.

What is claimed is:

1. A stress-optic beam scanner system which comprises:
    a) an optical beam source to provide an optical beam to be scanned;
    b) an optically transparent stress-optic material having a surface and an inlet window to receive the optical beam and an outlet window to transmit a refracted optical beam; the stress-optic material having properties to permit the scanning of the optical beam over scanning angles of greater than about five (5) degrees;
    c) a means to apply a mechanical force of a selected amount and direction to the stress-optic material sufficient to provide a change in the gradient of the index of refraction and its direction within the stress-optic material; and
    d) a target means to receive the transmitted refracted beam.

2. The system of claim 1 wherein the stress-optic material comprises a material with one or more of the following properties: an index of refraction of about 2.4 or greater, a Young's modulus less than about $3.2 \times 10^{+6}$ psi, and a stress-optical coefficient of greater than about $0.2 \times 10^{-6}$ per psi.

3. The system of claim 1 wherein the stress-optic material comprises an arsenic compound.

4. The system of claim 1 wherein the beam source comprises a laser beam source of about 630 nm to 2000 nm.

5. The system of claim 1 wherein the means to apply a mechanical force is generally perpendicular to the surface of the stress-optic material, thereby compressing a portion of said material, and generally perpendicular to the optical beam in the stress-optic material.

6. The system of claim 1 wherein the means to apply a mechanical force includes a piezoelectric material applied to one or more surfaces of the stress-optic material.

7. The system of claim 6 which includes a microprocessor means to apply and monitor a controlled amount of electrical signals to the piezoelectric material.

8. The system of claim 7 which includes a feedback control means to receive a reflected optical beam from the target means through the stress-optic material to control the microprocessor means.

9. The system of claim 8 which includes an X and Y A/D converter and X and Y amplifier to provide a two-dimensional (X,Y) scanning system.

10. The system of claim 1 wherein the target means comprises a bar code or two-dimensional matrix on an article.

11. The system of claim 1 wherein the target means comprises a satellite or a missile.

12. The system of claim 1 which comprises a two-dimensional scanner system and wherein the means of applying the mechanical force is to multiple sides of the stress-optic material to provide X,Y dimensional scanning.

13. The system of claim 1 which comprises a two-dimensional scanner system, and wherein two stress-optic materials are arranged in series at an angle to each other, and the means to apply mechanical force applies force to each stress-optic material to produce scanning for each (X,Y) dimension.

14. The system of claim 1 wherein the stress-optic material includes a selected section of the internal inlet window and internal outlet window, with mirror material to reflect in multiple process the optical beam within the stress-optic material, and thereby increase the optical beam path length, and resultant angle of deflection.

15. The system of claim 1 which comprises a two-dimensional scanner system, and wherein the means to apply the mechanical force applies a bending moment gradient in one dimension and applies a compressive stress gradient in another dimension to the same stress-optic material.

16. The system of claim 1 wherein the target means comprises one or more satellites and the system is on a satellite.

17. The system of claim 1 wherein the target means is a bar or two-dimensional matrix code and which system includes: detector means to detect the scanning beam reflected by the bar or matrix code and provide a detector signal; a microprocessor and memory means to receive the detector signal, to decode the signal, and to store this signal; and receiving means to display the decoded and stored signal.

18. The system of claim 1 which includes multiple stress-optic materials arranged to provide for the slightly overlapping of each scanning beam and scanned area and so as to increase the total scanning angle of the combined transmitted beams.

19. The system of claim 1 which includes an inlet lens to focus the optical beam and an outlet lens thus to magnify the scanning angle of the transmitted optical beam.

20. The system of claim 1 wherein the optical beam source comprises a pulsed laser source to provide a coherent laser beam and the means to apply a mechanical force to the stress-optic material comprises one or more piezoelectric plates on the stress-optic material; and which system includes a microprocessor control means to provide electrical signals to the piezoelectric plates to control the direction and pattern of the optical beam at a scanning speed of greater than 1 kHz for on command scanning of the target means.

21. The system of claim 1 wherein the optical beam source comprises a coherent pulsed laser to provide a laser beam.

22. The system of claim 1 which includes a single mode fiber as the target means.

23. The system of claim 22 wherein the optical light source comprises a pulsed laser source; and the system includes a microprocessor control means to control the means to apply mechanical force so as to continuously and controllably provide alignment of the transmitted pulse laser beam to the core of the single mode fiber.

24. The system of claim 1 wherein the optical beam source comprises a laser source, and the stress-optic material is integrated onto the front of the laser source to provide for laser beam scanning in two dimensions from the single laser source.

25. A stress-optic, two-dimensional beam scanner system which comprises:
   a) a laser beam source to provide an optical beam;
   b) a single optically transparent stress-optic material having an inlet window to receive the optical beam and an outlet window to transmit a refracted optical beam; the stress-optic material having properties to permit the refracting of the optical beam over scanning angles of greater than about five (5) degrees or a speed greater than about 1 kHz;
   c) piezoelectric material applied to multiple sides of the stress-optic material to apply independent mechanical forces of selected amount in the X and Y directions to the stress-optic material and to provide a change in gradient in two dimensions of the index of refraction of the stress-optic material; and
   d) a microprocessor means to apply electrical power in a selected controlled manner to the piezoelectric means to provide an (X,Y) two-dimensional refracted beam to be transmitted from the outlet window onto a target.

26. A method of providing a two-dimensional scanning beam to a target which method:
   a) provides an optical beam for scanning purposes;
   b) transmits the optical beam from the inlet window to the outlet window of a stress-optic material, the stress-optic material having properties to permit the beam to scan over an angle of greater than about five degrees or a speed greater than 1 kHz, to provide a transmitted scanning beam;
   c) applies mechanical force to the stress-optic material of selected amount and in two different dimensions to the stress-optic material to provide a change in the gradient of the index of refraction in two-dimensions (X,Y) in the stress-optic material and a transmitted two-dimensional (X,Y) scanning beam onto a target.

27. A stress-optic beam scanner system which comprises:
   a) an optical beam source to provide an optical beam to be scanned;
   b) an optically-transparent, stress-optic material having a surface and an inlet window to receive the optical beam and an outlet window to transmit a refracted optical beam; the stress-optic material having properties with one or more of the following properties: an index of refraction of about 2.4 or greater, a Young's modulus less than about $3.2 \times 10^{+6}$ psi, and a stress-optical coefficient of greater than about $0.2 \times 10^{-6}$ per psi to permit the scanning of the optical beam;
   c) a means to apply a mechanical force of a selected amount and direction to the stress-optic material sufficient to provide a change in the gradient of the index of refraction and its direction within the stress-optic material; and d) a target means to receive the transmitted refracted beam.

28. The system of claim 27 wherein the means to apply a mechanical force is generally perpendicular to the surface of the stress-optic material, thereby compressing a portion of said material, and generally perpendicular to the optical beam in the stress-optic material.

29. The system of claim 27 wherein the means to apply a mechanical force includes a piezoelectric material applied to one or more surfaces of the stress-optic material.

30. The system of claim 29 which includes a microprocessor means to apply and monitor a controlled amount of electrical signals to the piezoelectric material.

31. The system of claim 30 which includes a feedback control means to receive a reflected optical beam from the target means through the stress-optic material to control the microprocessor means.

32. The system of claim 31 which includes an X and Y A/D converter and X and Y amplifier to provide a two-dimensional (X,Y) scanning system.

33. The system of claim 27 wherein the target means comprises a bar code or two-dimensional matrix on an article.

34. The system of claim 27 wherein the target means comprises a satellite or a missile.

35. The system of claim 27 which comprises a two-dimensional scanner system, and wherein two stress-optic materials are arranged in series at an angle to each other, and the means to apply mechanical force applies force to each stress-optic material to produce scanning for each (X,Y) dimension.

36. The system of claim 27 wherein the stress-optic material includes a selected section of the internal inlet window and internal outlet window, with mirror material to reflect in multiple process the optical beam within the stress-optic material, and thereby increase the optical beam path length, and resultant angle of deflection.

37. The system of claim 27 which comprises a two-dimensional scanner system, and wherein the means to apply the mechanical force applies a bending moment gradient in one dimension and applies a compressive stress gradient in another dimension to the same stress-optic material.

38. The system of claim 27 wherein the beam scanner system scans at a speed of greater than about 1 kHz.

39. The system of claim 27 wherein the stress-optic material is selected from the group consisting of dense flint glass, lead molybdate, arsenic trisulfide, and germanium selenide arsenide.

40. A system of claim 27 which includes:
   a) a plurality of individual optically transparent stress-optic materials and a plurality of individual piezoelectric materials as the means to apply mechanical force to each of the individual stress-optic materials, the stress-optic material having a reflective mirror outlet window to form a primary mirror;
   b) a microprocessor to provide electrical control to the individual piezoelectric materials;
   c) a sensor to receive a sample or reference beam and to provide an electrical connective signal via the microprocessor to the individual piezoelectrical materials, which provides sufficient mechanical force to restore a planar wavefront to an incoming optical beam from an astronomical source, or to ensure a planar wavefront when an outgoing optical beam from the optical beam source has reached a target means, such as a satellite.

41. A method of providing a two-dimensional scanning beam to a target which method:
   a) provides an optical beam for scanning purposes;
   b) transmits the optical beam from the inlet window to the outlet window of a stress-optic material, the stress-optic material having properties with one or more of the following properties: an index of refraction of about 2.4 or greater, a Young's modulus less than about $3.2 \times 10^{+6}$ psi, and a stress-optical coefficient of greater than about $0.2 \times 10^{-6}$ per psi to provide a transmitted scanning beam;
   c) applies mechanical force to the stress-optic material of selected amount and in two different dimensions to the stress-optic material to provide a change in the gradient of the index of refraction in two dimensions (X,Y) in the stress-optic material and a transmitted, two-dimensional (X,Y) scanning beam onto a target.

* * * * *